Aug. 7, 1956  C. O. RINGNESS  2,757,807
BALE LOADER ATTACHMENT FOR VEHICLES
Filed Oct. 22, 1953  2 Sheets-Sheet 1

INVENTOR
CORNELL O. RINGNESS
BY Williamson, Williamson
Schroeder & Adams
ATTORNEYS

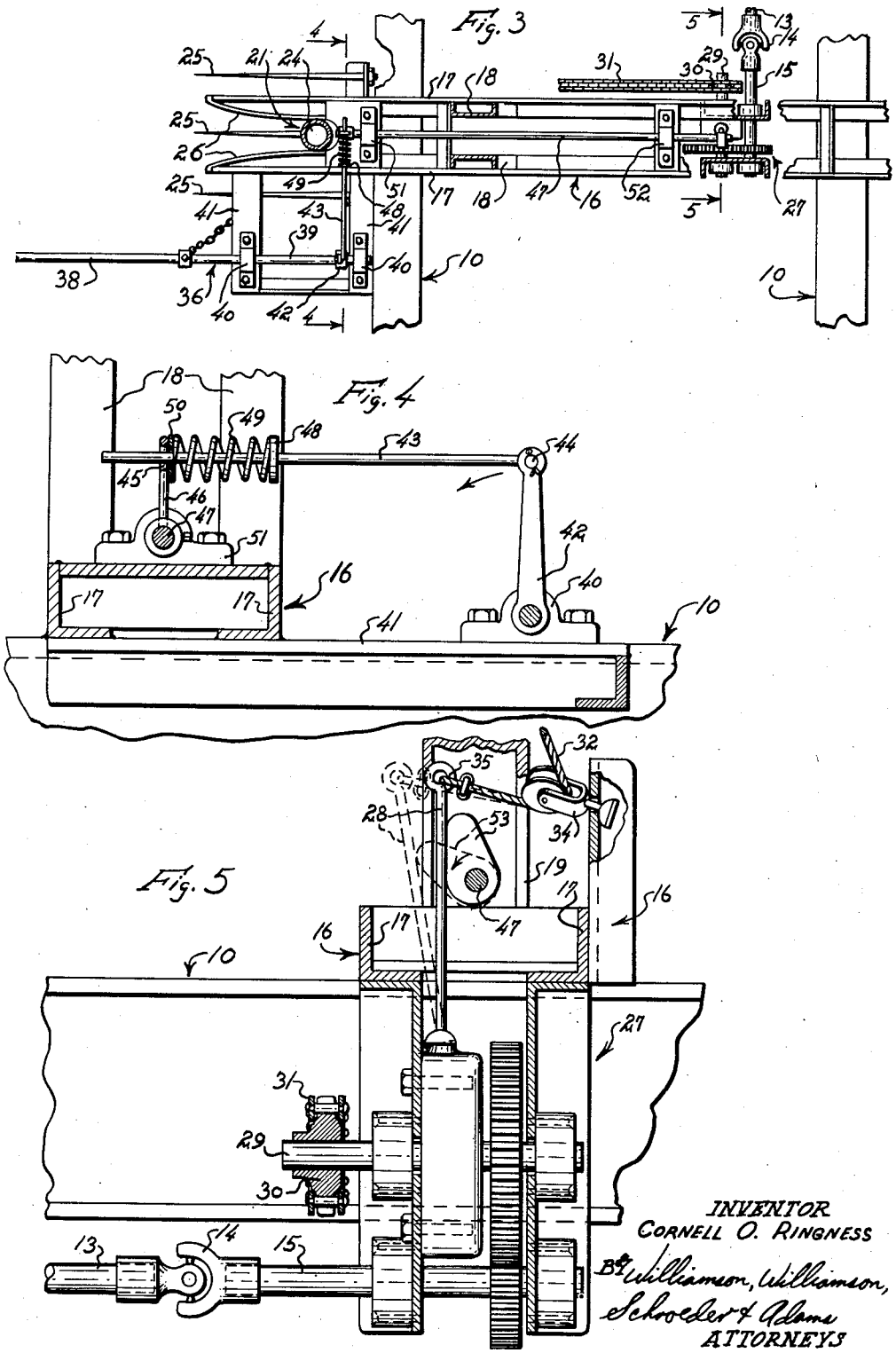

United States Patent Office 2,757,807
Patented Aug. 7, 1956

2,757,807

BALE LOADER ATTACHMENT FOR VEHICLES

Cornell O. Ringness, Pennock, Minn., assignor of one-fifth to Orlyn B. Skare and one-fifth to John O. Iverson, Minneapolis, Minn., one-fifth to Ole J. Skare, Santa Monica, Calif., and one-fifth to Ingvald O. Flolo, Minneapolis, Minn.

Application October 22, 1953, Serial No. 387,574

4 Claims. (Cl. 214—80)

This invention relates to a loader and, more particularly, to a loader for hay bales and the like which is operative in conjunction with a vehicle having a loading box or rack secured in connection therewith.

It is an important object of the invention to provide an apparatus which will quickly and positively engage and raise articles such as hay bales from their position of rest on the ground up to a loading position over a vehicle rack or box, the operation of the apparatus being initiated by a mechanism engageable by the article itself during the forward travel of the apparatus.

It is another object of the invention to provide a device which will automatically impale and raise a bale from the ground up to a transporting carrier, the device having means for quick reconditioning which will ready it for the next bale.

It is a further object of the invention to provide a bale loader having an impaling arm which operates in a direction lateral to the bale, the proper positioning of the bale for picking up being determined by the direction of travel of the loader and by physical contact between the bale and tripping mechanism rearwardly of the impaling arm.

It is a still further object of the invention to provide a simple and efficient apparatus which will quickly and positively engage and load bales upon a carrier with a minimum of attention on the part of the operator and in rapid succession where the bales are closely aligned.

These and other objects and advantages of my invention will more fully appear from the following description made in connection with the accompanying drawings wherein like reference characters refer to the same or similar parts throughout the several views and in which:

Fig. 3 is a horizontal view of my apparatus taken on the line 3—3 of Fig. 2, portions of the truck frame being cut away to better show the operation of my apparatus;

Fig. 4 is a vertical detailed section of a portion of the trip mechanism taken on the line 4—4 of Fig. 3; and Fig. 5 is a vertical enlarged section of another portion of the trip mechanism shown in the clutch and driving connection and taken on the line 5—5 of Fig. 3.

Figure 1:
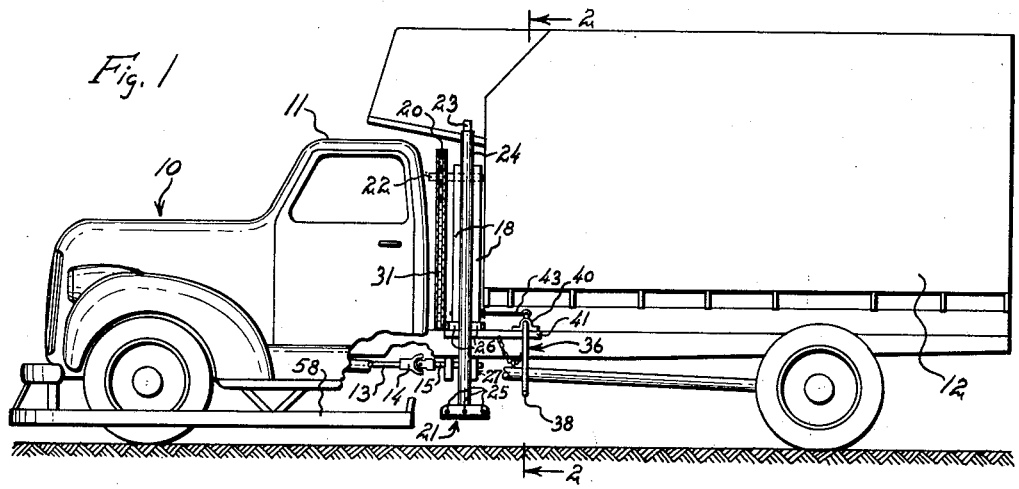
Fig. 1 is a side elevation of a truck having a loading box disposed rearwardly of a cab and my loading apparatus mounted between the cab and the box, portions of the truck body being cut away to better show the arrangement of the parts.

Referring now to the drawings and more particularly to Fig. 1, my device is there shown mounted upon a conventional transporting vehicle such as a truck 10 having a cab 11 at the forward portion thereof and a box or rack 12 disposed to the rear. The truck 10 preferably has a power take off terminating in a drive shaft 13 and which may be coupled through a universal joint 14 to another drive shaft 15 for a purpose which will be disclosed hereinafter.

Figure 2:
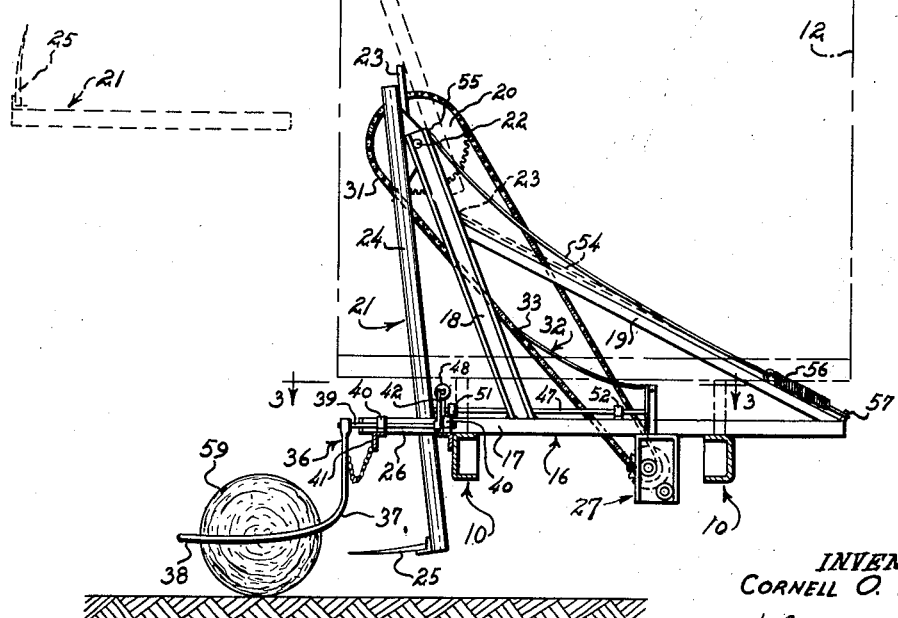
Fig. 2 is a rear view of my bale loading apparatus taken on the line 2—2 of Fig. 1, the rearward portions of the truck being omitted and the forward portions shown in dotted outline.

My invention comprises an automatic loader which may be preassembled together with the truck during the manufacture thereof or may be supplied as an attachment capable of being mounted between the cab and truck vehicle box and operable within the narrow space provided therebetween. A mounting structure 16 comprises a pair of base members 17, a pair of upright standards 18 secured thereto as shown in Fig. 2 and bracing members 19 extending from an upper position on the standards 18 to a rearward position on the base member 17. Additional bracing means may be supplied as necessary. The supporting structure 16 is preferably formed to provide narrow framework which can be mounted in the aforementioned narrow space while still allowing free operability of the moving mechanism mounted thereon. At the upper end of the standards 18 is journaled a driven sprocket 20, the sprocket having secured thereto an impaling arm 21 in such a position that it lies forwardly of the axis 22 of sprocket 20 and has an upper extension terminating in an abutment 23 for a purpose which will be discussed hereinafter. The impaling arm in turn comprises an elongated shaft 24 which terminates below framework 16 in a set of impaling means such as the tines 25. These tines preferably extend outwardly at substantially right angles to the shaft 24 and may have a slight curvature simulating the curvature of an ordinary pitch fork.

In normally retracted or non-operable position the impaling arm 21 lies in a cradle comprising flared arms 26 which in turn are secured to the forward ends of the base members 17 in the framework 16. The impaling arm is adapted to swing outwardly in a single plane which is preferably in right angles to the direction of forward travel of vehicle 10, the path of the tines being arcuate and the uppermost position of the impaling arm being indicated by dotted lines in Fig. 2.

Referring now to Fig. 3, the clutch mechanism 27 is mounted to the underside of framework 16 and may include a gear reduction box with a clutch arm or actuator 28 extending upwardly therefrom as shown and as more clearly set forth in Fig. 5. The driven shaft of the clutch and gear reduction mechanism is indicated at 15 and is united by the universal joint 14 as previously noted. The clutch mechanism 27 is of usual construction, the shaft 15 being constantly driven during operation of the device and the clutch arm 28 serving to engage and disengage a stub shaft 29 in a manner common to clutch mechanisms. In the specific mechanism shown, the driving union is effected when the shaft 28 is moved from its full line position shown in Fig. 5 to the dotted line position thereof. Secured to the stub shaft 29 is a pinion sprocket 30 which is in turn aligned with the driven sprocket 20 and in driving connection therewith through such means as roller chain 31. When the clutch arm 28 is moved to its full line position shown in Fig. 5, the pinion 30 is freely rotatable in the opposite direction and completely disengaged from the driving connection through shaft 15.

Referring now to Figs. 2 and 5, a clutch arm return mechanism comprises an interconnecting member such as flexible cable 32 which is fastened to the lower side of roller chain 31 at the point 33. The cable 32 preferably passes through a direction changing means such as pulley 34 which in turn is attached to a part of the frame 16. The end of the cable is attached at 35 to the clutch arm 28. When the cable 32 is drawn taut and pulled further, it will actuate the clutch arm 28 to the right as shown in Fig. 5 and disengage the pinion 30 from the driving shaft 15.

A trip mechanism for actuating the impaling arm is indicated generally at 36 and constitutes an eccentrically mounted member such as the crank 37 having an outwardly extending portion 38 which is substantially horizontal with the ground and extends laterally of the direction of travel of the transporting vehicle 10, and further is positioned in spaced rearward relation with the tines 25 of the impaling arm 21. The crank is rigidly secured to a shaft 39 which in turn is journaled in bearings 40 upon a rearward frame extension 41 secured in turn to the base frame 17 of the supporting structure 16. The shaft 39 has a radial arm 42 secured thereto as shown in Fig. 4. A plunger rod 43 is pivotally secured at 44 to the upper end of the radial arm 42 and slidably extends through an opening 45 formed at the upper end of lever 46, the lever 46 being fixed to a countershaft 47 as shown. A bearing collar 48 is attached to the plunger rod 43 in spaced relation with the upper end of the lever 46. A compression spring 49 is positioned between the bearing collar 48 and the upper end of lever 46, a bearing washer 50 preferably being interposed between the spring and the lever. The countershaft 47 to which the lever 46 is secured is in turn journaled in a pair of bearings 51 and 52 which are mounted lengthwise of the base frame 17 and in a direction lateral to the direction of travel of the transporting vehicle 10. The countershaft 47 extends through the bearing 52 and has secured thereto a short cam member 53 as shown more clearly in Fig. 5. When the cam member 53 is in upper position as shown by the full line representation, the crank extension 38 is in its normal and lowermost position shown in Fig. 1. The cam 53 is adapted to engage a medial portion of the clutch arm 28 to reciprocate the arm from clutch engaging to clutch disengaging position.

In order to start the impaling arm in its return movement for rapid consecutive loading, a spring tensioned cable 54 is secured at 55 to the upper end of the standards 18 and is connected at its lower end to a tension spring 56 which in turn is secured at its outermost end to the base frame 17 at 57 as shown in Fig. 2. The cable 54 is so aligned as to be engageable by the abutment 23 when the impaling arm 21 is swung to its dotted line position.

In the operation of my bale loader, the transporting vehicle 10 is driven in a field containing bales such as hay, the general alignment of bales being retained to the left of the vehicle driver so that the front left wheel of the truck may pass in proximity thereto. A bumper 58 which is a common expedient in bale loaders may be provided to straighten a bale 59 so that it will lie lengthwise with the direction of travel of the transporting vehicle. As the vehicle moves forwardly, the driving shaft 13 simultaneously rotates causing the driving portion of the clutch mechanism 27 to continuously operate. The clutch arm or actuator 28 is then in its neutral full line position as shown in Fig. 5 and the pinion 30 is disengaged from the clutch connection and free to rotate at will. As the truck 10 proceeds the trailing end of the bale 59 will pass relative to the impaling arm 21 and will engage the eccentric extension 38 of crank 37. The crank will then be swung in a counterclockwise direction from that shown in Fig. 1, the bale presenting its inward side at substantially right angles to the tines 25 of the impaling arm 21. With the eccentric extension 38 swung to the right, the cam 53 through countershaft 47 will be rotated through an arc from the full line position to the dotted line position in a counterclockwise direction as viewed in Fig. 5. The cam 53 will bear upon a medial portion of the clutch actuator or arm 28 causing it to move to the dotted line position. The pinion sprocket 30 will then be drawn into engagement with the driving shaft 15 within the clutch mechanism 27 and will immediately cause the driven sprocket 20 to begin rotating in a clockwise direction as viewed in Fig. 2. The impaling arm 21 will rapidly move in a lateral direction from its cradled position within the flared arms 26 and the tines 25 will impale the hay bale 59 from the inner side thereof. The bale will immediately be raised in an outward swinging movement until the arm reaches the dotted line position of Fig. 2. When the arm 21 is in its uppermost position, the bale 59 will, through its momentum be discharged from the tines 25 into the forward portion of the rack or box 12 from which it can be stacked in position within the box by an operator located therein. When the arm 21 is in the dotted line position of Fig. 2, the abutment 23 will engage the cable 54, bending it so as to tension the spring 56. As the arm 21 continues in its clockwise rotation, the cable 32 will become tensioned and pull the clutch actuator or arm 28 back against the cam 53 to its disengaged full line position indicated in Fig. 5. Immediately upon disengagement of the clutch arm or actuator 28, the arm 21 will spring backwardly under influence of the spring 56 and be started upon its downward return travel. In its intermediate downward travel, the weight of the impaling arm will assist in quick return to its position of rest in the flared cradle 26. The rapid return of impaling arm 21 is important, especially when consecutive bales 59 lie in close proximity in the field. I have found that my apparatus can be so rapidly reconditioned that bales may be picked up where they are aligned in spaced relation of ten foot intervals. To the best of my knowledge, prior bale loaders cannot effect a reconditioning nor are they capable of otherwise handling and loading bales at such close spacing.

In the event the adjustment of my clutch disengaging mechanism is not properly made or becomes out of adjustment through usage of the apparatus, trip arm or crank 37 may be caused to rotate farther than necessary from its depending position of rest. In order to prevent breakage of the trip mechanism, I have interposed the compression spring 49 so as to relieve the strain exerted by the cam 53 on clutch arm 28. With the impaling arm 21 in its lowermost position, there is very small resistance to initiating of its upward movement. Hence, the engagement of the clutch is easily effected without undue wear or clashing of gears.

It may thus be seen that I have devised a simple and efficient bale loading device which is extremely compact and can be mounted between the cab of a truck and the rearwardly disposed box or rack thereof to effect a rapid and trouble-free bale loading operation which is fully automatic and causes but a minimum of damage to the bales themselves, the picking up and discharging of the bale being accomplished in a single plane and with smooth introduction and withdrawal of the tine elements.

It will, of course, be understood that various changes may be made in the form, details, arrangement and proportions of the parts without departing from the scope of my invention.

What I claim is:

1. An automatic loader for articles such as hay bales and the like adapted to be used in conjunction with a wheeled transporting vehicle, comprising an impaling arm pivotally mounted at an upper position on said vehicle for swinging movement laterally of the forward direction of travel of said vehicle and for impaling thereon an article such as a hay bale from the side thereof, said impaling arm normally being held at a lower position in readiness to engage said article, a trip crank having an eccentric extension disposed rearwardly of the lower portion of said impaling arm and adapted to be swung in the direction of travel of said vehicle, and drive means for actuating said impaling arm to move outwardly from its inoperative position to engage said article from the side and elevate it to an upper position with respect to said vehicle, said drive means being actuated upon engagement and rearward swinging movement of the eccentric extension by a rear portion of said article during forward travel of the vehicle.

2. An automatic loader for articles such as hay bales and the like adapted to be used in conjunction with a wheeled transporting vehicle, comprising an impaling arm pivotally mounted at an upper position on said vehicle and substantially at the side of said vehicle for swinging movement outwardly of said side of the vehicle and lateral to the forward direction thereof for impaling thereon an article such as a hay bale from the side thereof, said impaling arm normally being held at a lower position retracted toward the vehicle in readiness to engage said article, a trip mechanism having an extension disposed rearwardly of the lower portion of said impaling arm and outwardly therefrom while said impaling arm is in normal retracted position, said extension being adapted to be swung in the direction of travel of said vehicle, and drive means for actuating said impaling arm to move outwardly from its retracted position to engage and impale under momentum of said arm the side of the article and in the same impaling movement to lift the bale outwardly and upwardly from contact with the ground to an upper position with respect to said vehicle, said drive means being actuated upon engagement and rearward movement of the extension by a rear portion of said article during forward travel of the vehicle.

3. The subject matter set forth in claim 2 and trip means disengaging said drive means for quick return of the impaling arm upon reaching said upper position.

4. The subject matter set forth in claim 2 wherein said impaling arm is mounted pivotally for swinging in a single plane substantially at right angles to the direction of travel.

References Cited in the file of this patent
UNITED STATES PATENTS

| | | |
|---|---|---|
| 872,459 | Satre | Dec. 3, 1907 |
| 2,201,088 | Hamon | May 14, 1940 |
| 2,225,787 | McDermott et al. | Dec. 24, 1940 |
| 2,453,384 | Renken | Nov. 9, 1948 |
| 2,525,735 | Symons | Oct. 10, 1950 |
| 2,690,851 | Johnson | Oct. 5, 1954 |
| 2,704,164 | David | Mar. 15, 1955 |